W. A. SHIPPERT.
STRIPPING DEVICE FOR MILKING MACHINES.
APPLICATION FILED NOV. 15, 1917.
1,351,798.
Patented Sept. 7, 1920.
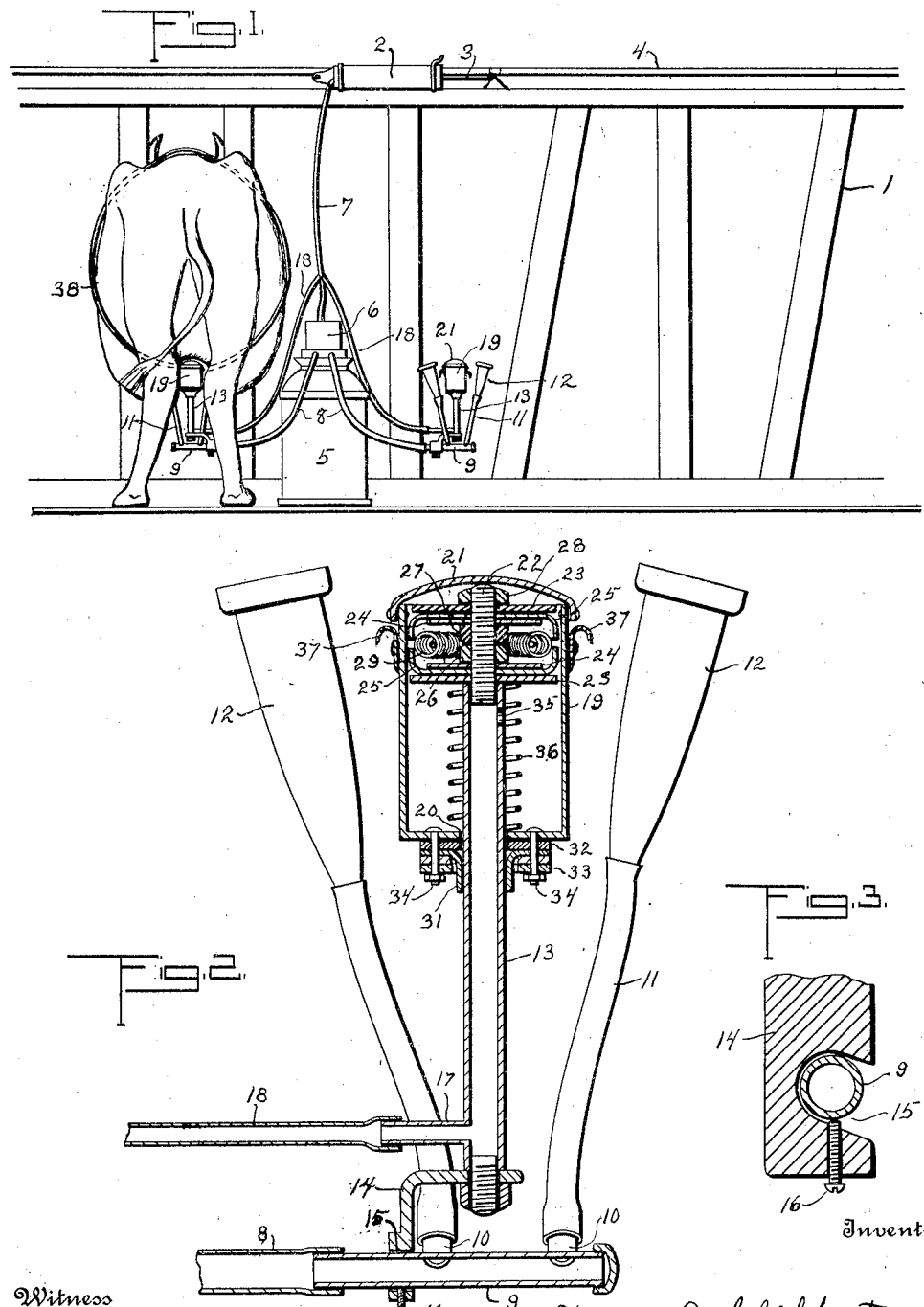

UNITED STATES PATENT OFFICE.

WARREN A. SHIPPERT, OF CHICAGO, ILLINOIS.

STRIPPING DEVICE FOR MILKING-MACHINES.

1,351,798. Specification of Letters Patent. Patented Sept. 7, 1920.

Application filed November 15, 1917. Serial No. 202,137.

*To all whom it may concern:*

Be it known that I, WARREN A. SHIPPERT, a citizen of the United States, residing at Chicago, in the county of Cook and State of Illinois, have invented certain new and useful Improvements in Stripping Devices for Milking-Machines, of which the following is a specification.

My invention has reference to stripping devices for milking machines, and is designed to assist in the operation of the machine so that the same can be carried on more expeditiously, and with such results that it will be unnecessary to finish the milking of the cow by hand, as is usually the case where mechanical devices are used for that purpose. My invention is simple in construction, efficient in operation, and can be quickly attached to milking devices now in general use.

A cow's udder contains a large number of milk ducts of pocket formation, the floors of which are below the openings therefrom. So long as the milk glands function freely there is a constant discharge of the milk through the milk duct and into the teat, where it is drawn outwardly by the operation of the machine, when in use. As soon as the glands cease functioning freely, however, the milk remaining in the ducts cannot flow therefrom by reason of the outlet being at too high a point. For this reason it is necessary to either strip the animal by hand, after the machine is removed, or provide some means for assisting in the discharge of the milk from the glands, in connection with the rest of the operation.

In most milking machines the work is carried on through a plurality of teat-cups, into which the milk is drawn by intermittent suction action, and by the use of my device I aim to produce a strong kneading effect upon the cow's udder, centrally of the teats, causing at the same time a firm down pull on the teats at the time the suction is applied thereto. This results in the milk ducts being inverted or upset, so that the last of the milk contained therein will flow therefrom into the teat, and within range of the suction effect in the teat-cup. When the machine is in operation the practically continuous action of the stripper mechanism in raising and lowering the openings of the milk ducts will cause the milk to move more rapidly and will result in the animal being milked clean.

The construction, arrangement and operation of the parts of my invention will more fully appear in the following specification, reference being had to the drawings accompanying the same, in which Figure 1 is an elevation of a section of a system embodying my invention. Fig. 2 is a vertical longitudinal section of my device, in position on the milking apparatus, as when in use. Fig. 3 is a detail, showing the lower end of the bracket 14.

1 represents a portion of a frame-work, such as is employed in a cattle barn where a number of animals are kept. 2 is an air-pump, provided with a piston rod 3, connected with a reciprocating bar 4, actuated from any suitable source of power. Mounted on a milk receptacle 5 is a pulsating device 6, connected with the pump 2 by means of a pipe 7. By means of a tube 8 the pulsator 6 communicates with a union 9, from which project upwardly a plurality of hollow stems 10, to which are attached tubes 11, the outer ends of said tubes being connected with the usual teat-cups 12.

A hollow rod 13 is adapted to be vertically supported centrally of the teat-cup apparatus by means of a bracket 14 secured to the lower end of such rod and connected with the union 9 by means of an opening 15 in the lower end of said bracket, adapted to receive the pipe 9 and provided with a set-screw 16, by means of which such parts can be fastened together. The rod 13 has a lateral extension 17 which is connected with the air-pump hose 7 by means of a flexible tube 18, whereby the suction produced by the vacuum devices may be imparted to the rod 13.

Mounted on the upper part of the rod 13 is a casing 19, preferably in form of a cylinder, and provided in its lower wall with an opening 20 through which the rod 13 passes freely. The upper end of said casing is provided with a cap 21, of convex form, spaced from said cylinder sufficiently to permit a free intake of air thereto. In the upper end of the rod 13 is fixed a threaded pin 22, on which is mounted a piston, comprising a pair of outer plates 23 and inner plates 24, between each inner and outer pair of which plates is held a pair of flexible gaskets 25, having their edges turned toward each other, and forming a space in which may be retained a quantity of oil for lubricating purposes. The lower plates 23 and 24 are held in place near the lower end of the pin 22 by means of a nut 26 operable on said pin, the upper plates 23 and 24, with the interposed gasket, being held in place by means of nuts 27 and 28 on said pin. The outer edges of the gaskets 25 are held in a distended position by means of a coiled spring 29, centrally of which is a ring 30. By this means an air-tight contact of the gaskets against the inner wall of the casing 19 is assured.

An air-tight connection between the lower end of the casing 19 and the rod 13 is provided by a gasket 31, held between a pair of rings 32 and 33 and attached to the lower end of the casing by means of bolts 34. The downwardly turned portion of the gasket closely embraces the rod 13, permitting movement of said rod in the lower end of the casing, but preventing the passage of air into or out of the casing.

The channel in the rod 13 is in communication with the interior of the casing by means of a vent 35 in the wall of said rod, and said casing is held normally at the lowest point on said rod by means of an extensile coiled spring 36 interposed between the floor of the casing and the lower plate 23. Attached to the upper part of the casing 19 are hooks 37, to which may be connected the ends of a strap or surcingle 38, passing over the back of the animal and assisting in the support of the teat-cup apparatus and stripping device.

When the stripping device is properly positioned it is in contact with the cow's udder at a point centrally of the teats and teat-cups attached thereto. When the exhausting devices are put in operation to create a vacuum in the milking apparatus the suction produced thereby is also communicated to the casing 19 through the tube 18 and rod 13. As the air is exhausted from the interior of such casing the lack of pressure from within and the normal atmospheric pressure on the lower end of the casing causes the piston and lower end of the casing to be drawn toward each other, resulting in an upward movement of the casing, with a consequent forcing of the upper end, or rounded cap thereof, into the cow's udder. In the operation of the air-pump there is at all times a normal amount of suction in the teat-cups, which is increased in the exhaust movement of the pump. This normal amount of suction may be predetermined and the tension of the spring 37 made to conform thereto. As a result, as the strength of the vacuum increases so as to overcome the resistance of said spring, the spring begins to collapse under the upward movement of the casing 19. The teat-cups are therefore well seated upon the teats before the stripping device begins to exert a force downwardly upon the union 9 from which the teat-cups are supported. On the other hand, in the reverse movement of the pump and downward movement of the casing 19, the movement of the casing ceases while there is yet a certain amount of suction in the teat-cups.

Assuming the diameter of the piston to be two and one-half inches, the force of the thrust of the stripper is approximately twenty-six pounds under a vacuum in the teat-cup apparatus of fifteen pounds to the inch, or under the impulse of a normal atmospheric pressure.

It will be seen that there is an uninterrupted communication between the cylinder 19 and exhaust devices, no valves of any kind being employed. This not only precludes the danger of parts getting out of order but also permits a quick response of the stripping devices to the action of the pump.

The upward movement of the casing operates to cause a strong impact against the udder of the cow, simultaneously with the suction within the teat-cups and the drawing of the teats downwardly thereby. This results in a rapid and complete removal of the milk, as hereinbefore set forth.

The preferred form of my invention has been shown and described herein, but I do not wish to be understood as limiting myself thereto, as many adaptations and changes thereof can possibly be made without departing from the spirit thereof.

I claim:

1. A device of the class described, comprising a telescopic member, capable of being extended by suction within the same; and suction and pressure mechanism adapted to intermittently create a suction within said member and relieve the same; and means for holding said member in a normally closed position.

2. In a stripping device for milking machines, a rod adapted for attachment to the teat-cup apparatus of such machine and provided with a piston at one of its ends; a casing inclosing the piston end of said rod and forming an air-tight chamber thereon, said casing being adapted for engagement with a cow's udder, for the purpose of pommeling the same; and means for exhausting the air within said chamber to cause a movement thereof outwardly upon said rod.

3. In a stripping device for milking machines, a rod adapted for attachment to the teat-cup apparatus of such machine and provided with a piston at one of its ends; a casing inclosing said rod, having air-tight connection with said piston at one of its ends and air-tight connection with said rod at its opposite end; a convex cap on the outer end of said casing adapted for engagement with the udder of a cow, for a pommeling operation thereon; and means for exhausting the air within said casing, to cause a movement thereof outwardly on said rod.

4. In a stripping device for milking machines, a rod adapted at one of its ends for attachment with the teat-cup apparatus of a milking machine and provided with a piston at its opposite end; a casing inclosing said rod, having air-tight connection with said piston at one of its ends and air-tight connection with said rod at its opposite end, and adapted for reciprocatory engagement with the udder of a cow; means for exhausting the air within said casing to cause a movement thereof outwardly upon said rod; and means for holding said casing normally in a retracted position.

5. A device of the class described, comprising a hollow rod adapted for attachment to the teat-cup apparatus of a milking machine, a casing telescopically movable on said rod and capable of movement thereon under suction; and means communicating with said casing through said rod for exhausting the air within said casing.

6. A device of the class described, comprising a hollow rod capable of being attached to the teat-cup apparatus of a milking machine; a casing telescopically movable on said rod and capable of movement thereon under suction; means communicating with said casing through said rod for exhaustion of the air from said casing; and yielding means for holding said casing normally in a retracted position on said rod.

7. A device of the class described, comprising a hollow rod adapted for attachment to the teat-cup apparatus of a milking machine; a casing telescopically movable on said rod and capable of movement thereon under suction; and means for exhausting the air from said casing communicating therewith through said rod by way of a continuous valveless passage.

8. In a device of the class described, a hollow rod adapted at one of its ends for attachment to the teat-cup apparatus of a milking machine, and provided at its opposite end with a piston comprised of a pair of spaced-apart flexible members having inwardly turned edges; a casing having air-tight connection with said piston and provided at its inner end with means for air-tight connection with said rod; and means for the exhaustion of the air from said casing through said rod.

9. In a device of the class described, a hollow member adapted to be attached to the teat-cup apparatus of a milking machine, so as to project upwardly, a piston on the opposite end of said rod, formed of a pair of complementary flexible members; a casing inclosing the piston end of said rod and provided at its lower end with a flexible member having a sleeve-like engagement with said rod; and means for exhaustion of the air from said casing communicating therewith through said hollow member.

10. In a device of the class described, a hollow member adapted to be attached to the union of the teat-cup apparatus of a milking-machine, and provided on its free end with a flexible piston member formed in two parts, spaced apart; a casing inclosing the piston end of said rod and adapted to engage with said piston; means on said piston for giving air-tight contact with said casing; means at the lower end of said casing for forming an air-tight connection with said rod; and means for exhausting the air from said casing communicating therewith through said hollow member.

11. In a device of the class described, a hollow member adapted to be attached to the teat-cup apparatus of a milking machine, and provided on its free end with a piston formed of two flexible spaced-apart members; a casing inclosing the piston end of said hollow member and having air-tight connection with said piston; a cap on the upper end of said casing adapted for contact with a cow's udder; means for air-tight connection between the lower end of said casing and said hollow member; and a spring interposed between said piston and the lower end of said casing, holding said parts normally in a spaced-apart relation.

12. In a device of the class described, a hollow member adapted to be removably attached to the union of a teat-cup apparatus and provided at its free end with a piston; a casing on the free end of said hollow member having air-tight connection with said piston and with said rod below the same, and adapted for impact with the udder of a cow; means for exhausting the air within said casing and relieving the suction caused thereby; hooks on the outer wall of said casing; and a strap removably connected with said hooks and capable of being supported by the back of a cow.

13. A device of the class described, comprising a cylindrical air chamber, provided with a head at one of its ends; a plunger in said air-chamber, having a hollow stem slidable in said head in air-tight relation therewith, and communicating with said air-chamber; and suction and pressure mechanism connected with said stem, said air chamber being capable of a reciprocating movement with relation to said plunger.

14. In a machine of the class described, a cylindrical casing forming an air chamber; a plunger in said air-chamber provided with a hollow stem adapted at its outer end for attachment with the teat-cup apparatus of a milking machine; a suction and exhaust mechanism; and means of communication between said last-named mechanism and said air-chamber through said hollow stem, providing a continuous passage free from obstruction to the movement of the air in either direction.

15. In a stripping device for cow milking machines, a cylindrical shell provided with a convex cap; a plunger therefor comprising a pair of flexible cup-shaped members, spaced apart and forming an oil receptacle, means for holding the edges of said members in distended positions; and a stem for said plunger extending through the end of said shell and having an air-tight relation therewith.

16. In combination with a teat-cup apparatus and suction and pressure mechanism connected therewith, a tubular member adapted to be removably attached to said teat-cup apparatus, so as to project upwardly centrally thereof; a cylindrical member telescopically mounted on said tubular member and adapted to be moved upwardly thereon when suction is created between said members; and means of communication between said suction and pressure mechanism and said cylindrical member by way of said tubular member.

17. In combination with the teat-cup apparatus of a milking machine and mechanism for creating a suction therein and relieving the same, a tubular member rigidly connected with said teat-cup mechanism, so as to project upwardly centrally thereof; a member capable of a sliding telescopic action on the upper end of said tubular member and adapted to receive movement upwardly by suction between said members; and means for connecting said cylindrical member with said suction mechanism through said tubular member.

18. In combination with the teat-cut apparatus of a milking machine, and suction and pressure mechanism connected therewith, of a tubular member fixed to said teat-cup apparatus, so as to project upwardly centrally thereof; a cylindrical member movable on the upper end of said tubular member, in position for impact with the udder of a cow, and forming an air-tight chamber with said tubular member; means of communication between said chamber and said suction and pressure mechanism by way of said tubular member; and means for holding said tubular member and cylindrical member normally in contracted relation with each other.

19. In combination with the teat-cup apparatus of a milking machine, and suction and pressure devices connected therewith; a casing, a tubular member mounted on said teat-cup apparatus and telescopically united with said casing, so that movement is imparted to said casing upon the creation of a suction therein; and a suction and pressure conduit connected with said tubular member, and communicating through the same with said casing.

20. A device of the class described, comprising a teat-cup apparatus; mechanism for creating a vacuum therein and relieving the same; a telescopic member associated with said teat-cup apparatus, so as to be actuated by the suction therein, in position for impact with the udder of a cow, centrally of such apparatus; and means for holding said member normally in an inoperative position when the amount of suction exerted in said apparatus is below a predetermined degree.

21. In combination with the teat-cup apparatus of a milking-machine and devices connected therewith for maintaining therein a suction of varying intensity, a vibrating device associated with said teat-cup apparatus, and operatively connected with said suction devices, to be given a vibrating movement for impact with the udder of a cow; and means for retarding the action of said vibratory member until the degree of suction within the teat-cut apparatus has been increased beyond the minimum.

22. In combination with the teat-cup apparatus of a milking machine, and devices connected therewith for producing therein a suction of varying intensity and relieving the same; a tubular member associated with said teat-cup apparatus, centrally thereof, a casing telescopically mounted on said tubular member, and forming an air-tight chamber therewith; means of communication between such chamber and said suction mechanism through said tubular member; and a yielding member holding said casing normally in retracted position on said tubular member, and adapted to retard the movement of said casing until the suction has commenced in the teat-cup apparatus, and return said casing to a normal position before the intensity of the suction within the teat-cup apparatus has been reduced to a minimum.

23. In a device of the class described, the combination with a teat-cup apparatus and suction and pressure mechanism operatively connected therewith, a tubular member mounted on said teat-cup apparatus, connected at its lower end with said suction and pressure mechanism and provided at its upper end with an opening; a piston on the upper end of said tubular member; a casing inclosing the upper end of said tubular member and forming an air-tight chamber thereon; the action of said suction and pressure mechanism in said teat-cup apparatus operating to simultaneously create a suction in said casing to cause a movement thereof upwardly.

In testimony whereof I affix my signature in the presence of two witnesses.

WARREN A. SHIPPERT.

Witnesses:
 MELVIN C. SMECK,
 JULIAN W. HAGBERG.